Figure 1:
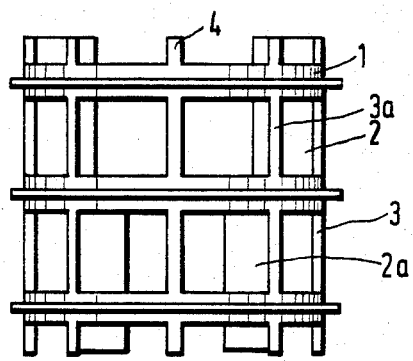

United States Patent [19]

Billet et al.

[11] Patent Number: 4,522,767
[45] Date of Patent: Jun. 11, 1985

[54] ANNULAR FILLING MEMBER FOR GAS-LIQUID CONTACT

[75] Inventors: Reinhard Billet, Bochum; Rainer Kober, Steinwiesen; Jerzy Makowiak, Bochum; Werner Geipel, Steinwiesen, all of Fed. Rep. of Germany

[73] Assignee: Paul Rauschert GmbH & Co. KG, Pressig, Fed. Rep. of Germany

[21] Appl. No.: 498,556

[22] Filed: May 26, 1983

[30] Foreign Application Priority Data

Jun. 4, 1982 [DE] Fed. Rep. of Germany ..... 32211287

[51] Int. Cl.³ .............................................. B01F 3/04
[52] U.S. Cl. .............................. 261/94; 261/DIG. 72
[58] Field of Search ................................... 261/94–98, 261/DIG. 72, 112; 210/150; 202/158; 55/90, 233

[56] References Cited

U.S. PATENT DOCUMENTS

| | | | |
|---|---|---|---|
| D. 243,531 | 3/1977 | Strigle, Jr. | 261/DIG. 72 |
| 3,266,787 | 8/1966 | Eckert | 261/DIG. 72 |
| 3,466,149 | 9/1969 | Blood et al. | 261/DIG. 72 |
| 3,914,351 | 10/1975 | McKeown et al. | 261/DIG. 72 |
| 4,067,936 | 1/1978 | Ellis et al. | 261/DIG. 72 |
| 4,122,011 | 10/1978 | Strigle, Jr. | 261/94 X |

FOREIGN PATENT DOCUMENTS

| | | | |
|---|---|---|---|
| 70918 | 2/1983 | European Pat. Off. | 261/DIG. 72 |
| 2711939 | 10/1977 | Fed. Rep. of Germany | 261/DIG. 72 |
| 917906 | 2/1963 | United Kingdom | 261/DIG. 72 |
| 1439745 | 6/1976 | United Kingdom | 261/DIG. 72 |
| 893237 | 12/1981 | U.S.S.R. | 261/DIG. 72 |

Primary Examiner—Richard L. Chiesa
Attorney, Agent, or Firm—Michael L. Dunn; William J. Crossetta

[57] ABSTRACT

This disclosure relates to an annular filling member, used in a gas/liquid contact apparatus such as a gas/liquid contact tower, and comprises one or more annular ribs having arranged thereon inwardly projecting, sharp-edge configured, alternately terminating drain plates which extend over a third to four fifths of the axial dimension of the member with the remainder of the axial dimension comprising a drain web.

19 Claims, 5 Drawing Figures

Fig.4
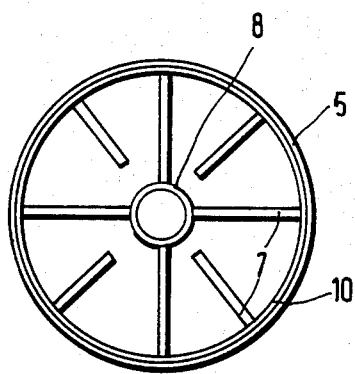
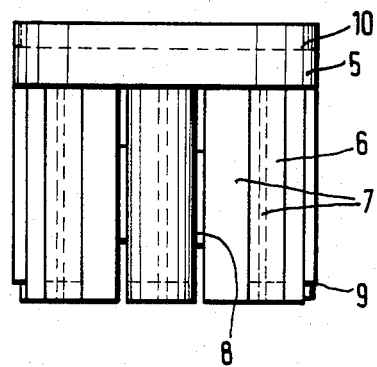
Fig.5

ANNULAR FILLING MEMBER FOR GAS-LIQUID CONTACT

The invention relates to an annular filling member for gas-liquid contact comprising at least one annular rib and drain plates arranged thereon at a spacing from each other and projecting radially into the interior of the annular configuration.

Filling or packing members having the above-indicated features are already known. They have a plurality of mutually spaced, corrugated, annular ribs of substantially circular cross-section, and six drain plates which are joined to the annular ribs by a fusion connection and which are produced by an extrusion process and which are cut off the extruded member and which therefore necessarily extend over the entire length of the axial dimension of the filling or packing member.

Although those filling members also have a grid-like structure, the material transfer which is achieved therewith, as well as their gas permeability, are not at their optimum levels.

The problem on which the present invention is based was therefore that of improving the known annular filling members in regard to the material transfer which can be achieved therewith, and their gas permeability.

The annular filling members according to the invention, for gas-liquid contact, comprising at least one annular rib and drain plates arranged thereon at a spacing from each other and projecting radially into the interior of the annular configuration, are characterised in that the drain plates extend only over a third to four fifths of the axial dimension of the filling member and are of a sharp-edged configuration.

Surprisingly, it was found that the above-indicated features solve the basic problem of the present invention, which is surprising particularly because the surface area of the drain plates is reduced, in comparison with the known filling members, so that a reduction in the material transfer should have been expected. In actual fact however, the reduction in the size of the drain plates does not reduce such transfer, but improves it, while at the same time the level of gas permeability of the filling member is increased, as the interior thereof is less obstructed by fitments therein, than in the state of the art.

The filling members according to the invention may comprise a material which can be produced with a sharp-edged configuration, in particular plastic material or metal. When using plastic materials, the sharp-edged configuration is achieved by producing the filling members by an injection moulding process. That also offers another technological advantage in comparison with the special extrusion process in which the annular ribs are secured in position by a fusion operation, for producing the known grid-like annular filling members, as the production operation is simpler by using injection moulding.

The filling members according to the invention may be used either for random packings or for orderly packings. In the latter case, the filling members may be marketed individually or in the form of already being joined together to form blocks, in single or plural layers, one above the other or one beside the other. In the latter case, the filling members are connected together as by adhesive or welding or by jointly injection moulding in the form of units made of a plurality of such members.

When reference is made herein to annular ribs, that does not necessarily signify the use of circular annular ribs, but also ribs in the form of a polygon such as a hexagon, octagon, and so on.

When moreover reference is made to drain plates, that term denotes integral components of the filling member, the thickness thereof being substantially less than their length and width. Therefore, in spite of the relatively small amount of space that they occupy, such drain plates provide two relatively large surfaces for forming a trickle-type film which permits excellent wetting of the liquid phase. The sharp drip edges and sharp-edged ribs enhance gas turbulence and thus material interchange.

It is particularly desirable for the drain plates to be extended over the remainder of the axial dimension of the filling member, in the form of drain web portions which are desirably also sharp-edged and which may be of different cross-section, such as square, T-shaped or other polygonal cross-section. Those drain web portions form only a slight obstacle to the flow of gases through the arrangement, so that they hardly affect the gas permeability of the filling member. On the other hand however, the web portions represent an additional means for achieving increased gas turbulence and thus enhanced material interchange.

The drain plates desirably extend approximately over half the axial dimension of the filling member so that, in accordance with a preferred embodiment of the invention, the adjoining drain web portions occupy the other half of the axial dimension of the filling member.

A filling member includes for example eight drain plates. In that connection, it is desirable for the drain plates to terminate alternately short of one end and the other end of the axial dimension of the filling member, that is to say, the drain plates are disposed alternately in the upper portion and in the lower portion of the interior of the filling member. If, in that arrangement, the drain plates occupy approximately half the axial dimension of the filling member, it is desirable for them to overlap somewhat in the middle region of the filling member, that is to say, they occupy for example about 55 to 60% of the axial dimension of the filling member.

The drain plates should leave sufficient space for the through-flow of gas, in the interior of the filling member, so that the width thereof is desirably from one eighth to five twelfths, preferably one sixth to two fifths, of the inside diameter of the filling member.

In certain cases, it may be desirable for a reinforcing member to be provided in the interior of the filling member, the reinforcing member being connected to at least a part of the drain plates and enhancing mechanical stability of the filling member. The reinforcing member may be for example in the form of a ring, or a cross which is joined to four drain plates. The reinforcing member may be formed by the distributor passages or gates in the injection moulding process. It is desirable however for the reinforcing member to be kept as narrow as possible in order to avoid excessively reducing gas permeability in the interior of the filling member. At any event, the reinforcing member should also be of a sharp-edged configuration.

A particularly desirable embodiment of the filling members according to the invention has a plurality of, such as for example three, annular ribs which are arranged parallel to each other, and thereon for example eight radially inwardly extending drain plates. If these or other filling members according to the invention are used for forming irregular or random packings, it is desirable for the drain plates or drain web portions constituting the extensions of the drain plates to be arranged to project at least beyond one of the outermost annular ribs, thereby to form additional drip-off tip portions. In the case of filling members for forming orderly or regular packings, it is desirable for such drip-off tip portions to be provided at most at one end of the annular filling member.

The dimensions and spacings of the individual components of the filling member are desirably so selected that the spacings of mutually adjacent parts of the filling member are from 8 to 15 mm, preferably from 10 to 15 mm, in particular from 10 to 12 mm. That applies for example in regard to the spacings of the annular ribs from each other, as well as in regard to the spacings of the drain plates and drain web portions from each other, insofar as they are disposed adjacent to each other.

When the filling members according to the invention are used for regular or orderly packings and are to be marketed in the form of individual filling members, it is desirable for them to be of such a configuration that they can be easily stacked one above the other in the filling column. For that purpose, it is desirable for the ends of the drain plates or drain web portions at one end of the filling member to be of such a configuration that they can be inserted into the outermost annular rib at the other end of the filling member. For that purpose, it may be desirable for the filling member to comprise only one annular rib at one end of the filling member, while the drain plates or drain web portions at the other end are not held by an annular rib and can therefore be compressed somewhat at their free ends, and can thus be inserted into the annular rib of the next adjacent filling member. That makes it possible for the filling members, when stacked one upon the other, to be joined together with a snug or press fit.

It is more expedient however for a shoulder or step configuration to be formed on the inside of the outermost annular rib at one end of the filling member, said shoulder or step configuration extending around the periphery of that rib, with a corresponding shoulder or step configuration being provided on the outside of the drain plates or web portions which project at the other end of the filling member, so that the free ends of the drain plates and drain web portions can be inserted into the periphery of the annular rib of the next adjacent filling member in such a way that the shoulder or step on the drain plates and drain web portions sits on the outermost end of the annular rib, while the outermost ends of the drain plates and drain web portions sit on the inner shoulder or step configuration on the annular rib. Desirably, the dimensions of the shoulders or steps are so selected as to provide a snug or press fit, which is further enhanced by the elasticity of the plastic material used.

Figure 2:
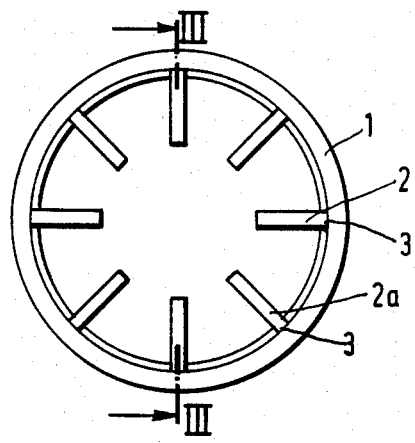
Figure 3:
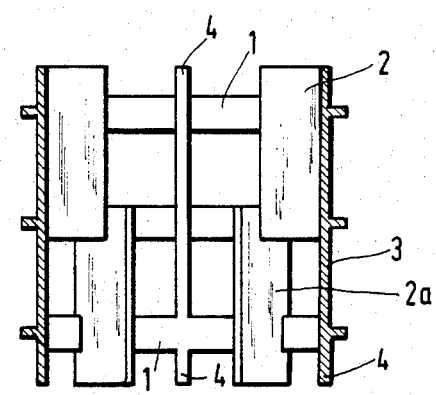

In the drawing:

FIG. 1 shows a side view of an embodiment of a filling member according to the invention, which is particularly suitable for random fillings or packings, FIG. 2 shows a plan view of the FIG. 1 filling member, FIG. 3 shows a view in section taken along line III—III in FIG. 2, FIG. 4 shows a plan view of another embodiment of the filling members according to the invention, which is particularly suitable for regular or orderly packings and which can be stacked, and FIG. 5 shows a side view of the FIG. 4 filling member.

The filling member illustrated in FIGS. 1 through 3, for random packings or fillings, has three sharp-edged annular ribs 1 of T-shaped cross-section, with the central limb portion of the T-configuration projecting outwardly. Integrally connected to the annular ribs 1, the filling member has eight drain plates 2 and 2a which are fitted alternately at top and bottom and which each begin at one end of the axial dimension of the filling member and extend to somewhat beyond the middle of the filling member, that is to say, they occupy about 60% of the axial dimension of the filling member. As can be clearly seen in FIG. 3, that therefore forms a overlap region in the middle of the filing member, where the mutually adjacent drain plates 2 and 2a overlap each other.

Drain limb or web portions 3 and 3a respectively adjoin each of the drain plates 2 and 2a, extending as far as the end of the axial dimension of the filling member. The drain plates and the drain web portions, the latter also being of T-shaped cross-section with the middle limb of the T-configuration projecting inwrdly, are also of a sharp-edged configuration.

The drain plates 2 and 2a and the adjoining drain portions 3 and 3a extend to a position beyond the outermost annular ribs 1, thereby forming drip-off tip portions 4.

The embodiment of a filling member according to the invention, as shown in FIGS. 4 and 5, is intended in particular for regular or orderly packings. It has a single annular rib 5 and axially extending bar portions 5 which are integrally secured to the rib 5, the drain plates 7 being cast or moulded on the bar portions 6. The bar portions 6 have a free end. An annular reinforcing member 8 is disposed in the interior of the filling member in order to stabilise same, with four of the drain plates being secured to the reinforcing member 8. The drain plates extend from the lower end of the bar portion 6 to the beginning of the relatively wide annular rib 5, that is to say, over about three quarters of the axial dimension of the filling member.

The annular rib 5 has an inner shoulder or step configuration as indicated at 10, and the bar portions 6 with the drain plates 7 secured thereto have outer steps or shoulders 9, which are of such dimensions that the bar portions 6 can be inserted into the annular rib 5 of the next adjacent filling member, and they can thus be stacked.

It will be appreciated that many modifications may be made without departing from the concept of the invention. For example, the annular ribs may be of a hexagonal or octagonal or other non-round configuration and may be of any cross-section, and for example the filling members which are intended for orderly or regular packings may have a grid-like or net-like structure, similar to that of the filling member shown in FIGS. 1 through 3.

We claim:

1. An annular filling member for gas-liquid contact comprising at least one annular rib having spaced apart drain plates arranged thereon projecting generally radially into the interior of the annular configuration and terminating in said interior, such that said drain plates extend at least in part as a sharp-edge configured plate portion for from about one-third to about four-fifths of the axial dimension of the filling member and over the remainder of the axial dimension of the filling member in the form of drain web portions, said sharp-edge configured plate portions starting alternately at one end and the other end and terminating alternately respectively before said other end and said one end of the axial dimension of the filling member.

2. A filling member according to claim 1 having a plurality of annular ribs which are arranged parallel to each other, and at least one of the configured plate portion or drain web portion of at least one drain plate projecting at least beyond one outermost annular rib, forming a drip-off tip portion.

3. A filling member according to claim 2 having at least one annular rib of sharp-edged configuration.

4. A filling member according to claim 2 having at least one drain web portion of sharp-edged configuration.

5. A filling member according to claim 2 having at least one configured plate portion of a drain plate extending over about half the axial dimension of the filling member.

6. A filling member according to claim 5 having at least one annular rib of sharp-edged configuration.

7. A filling member according to claim 5 having at least one drain web portion of sharp-edged configuration.

8. A filling member according to claim 1 having at least one configured plate portion of a drain plate extending over about half the axial dimension of the filling member.

9. A filling member according to claim 8 having at least one annular rib of sharp-edged configuration.

10. A filling member according to claim 8 having at least one drain web portion of sharp-edged configuration.

11. A filling member according to claim 1 having at least one annular rib of sharp-edged configuration.

12. A filling member according to claim 11 having at least one drain web portion of sharp-edged configuration.

13. A filling member according to claim 1 having at least one drain web portion of sharp-edged configuration.

14. A filling member according to claim 1, wherein at least one of the annular ribs or the drain web portions are of T-shaped cross-section.

15. A filling member according to claim 1, wherein the middle region thereof has a reinforcing member which is connected to a part of at least one drain plate.

16. A filling member according to claim 1, wherein the configured plate portion of the drain plates has a width of from one eighth to five-twelfths of the inside diameter of the filling member.

17. A filling member according to claim 1, wherein the spacings of mutually adjacent parts of the filling member are from about 8 to about 15 mm.

18. A filling member according to claim 1, wherein the end of the configured plate portion of the drain plate or drain web portion which are located at one end of the filling member can be inserted into the outermost annular rib at the other end of the filling member.

19. A filling member according to claim 18 wherein one of the annular ribs at one end of the filling member has a peripherally extending shoulder configuration on its inside, and the drain plates or drain web portions at the other end of the filling member have a shoulder configuration of corresponding dimensions, on their outside.

* * * * *